United States Patent [19]

Huang et al.

[11] Patent Number: 4,665,812
[45] Date of Patent: May 19, 1987

[54] WALKWAY FOR A LIQUID HEAT TRANSFER CABINET

[75] Inventors: Min N. Huang, Madison; David L. Brethorst; Richard E. Ryan, both of Lodi, all of Wis.

[73] Assignee: DEC International, Inc., Madison, Wis.

[21] Appl. No.: 782,960

[22] Filed: Oct. 2, 1985

[51] Int. Cl.[4] .................. A23B 4/00; B61B 13/00
[52] U.S. Cl. .................................. 99/535; 99/517; 118/326; 118/DIG. 7
[58] Field of Search .......... 99/516, 534, 535, 483, 99/467, 473, 477, 478; 118/326, DIG. 7; 104/139, 140; 312/31, 350, 236; 404/17; 17/15, 24; 134/108, 105

[56] References Cited

U.S. PATENT DOCUMENTS 4,133,255  1/1979  Guice ........................ 118/DIG. 7
4,458,626  7/1984  Dessilani .................... 118/326 X
4,505,205  3/1985  Huang et al. ................ 99/535 X
4,517,888  5/1985  Gould ......................... 99/535 X Primary Examiner—Timothy F. Simone
Attorney, Agent, or Firm—Lee, Smith & Zickert

[57] ABSTRACT

A walkway for a liquid heat transfer cabinet for food products to preclude contamination of the liquid heat transfer medium so that an operator can manually load and unload the cabinet with product to be subjected to a heat transfer operation. The walkway includes a fixed channel-shaped member mounted above the floor so that the liquid level cannot enter the fixed member and a swingable channel-shaped member functioning as a cover to the fixed member and also disposable in open position to define a walkway area like the fixed member and above the liquid level. In closed position the cover member prevents liquid from entering the area of the fixed channel-shaped member.

10 Claims, 5 Drawing Figures

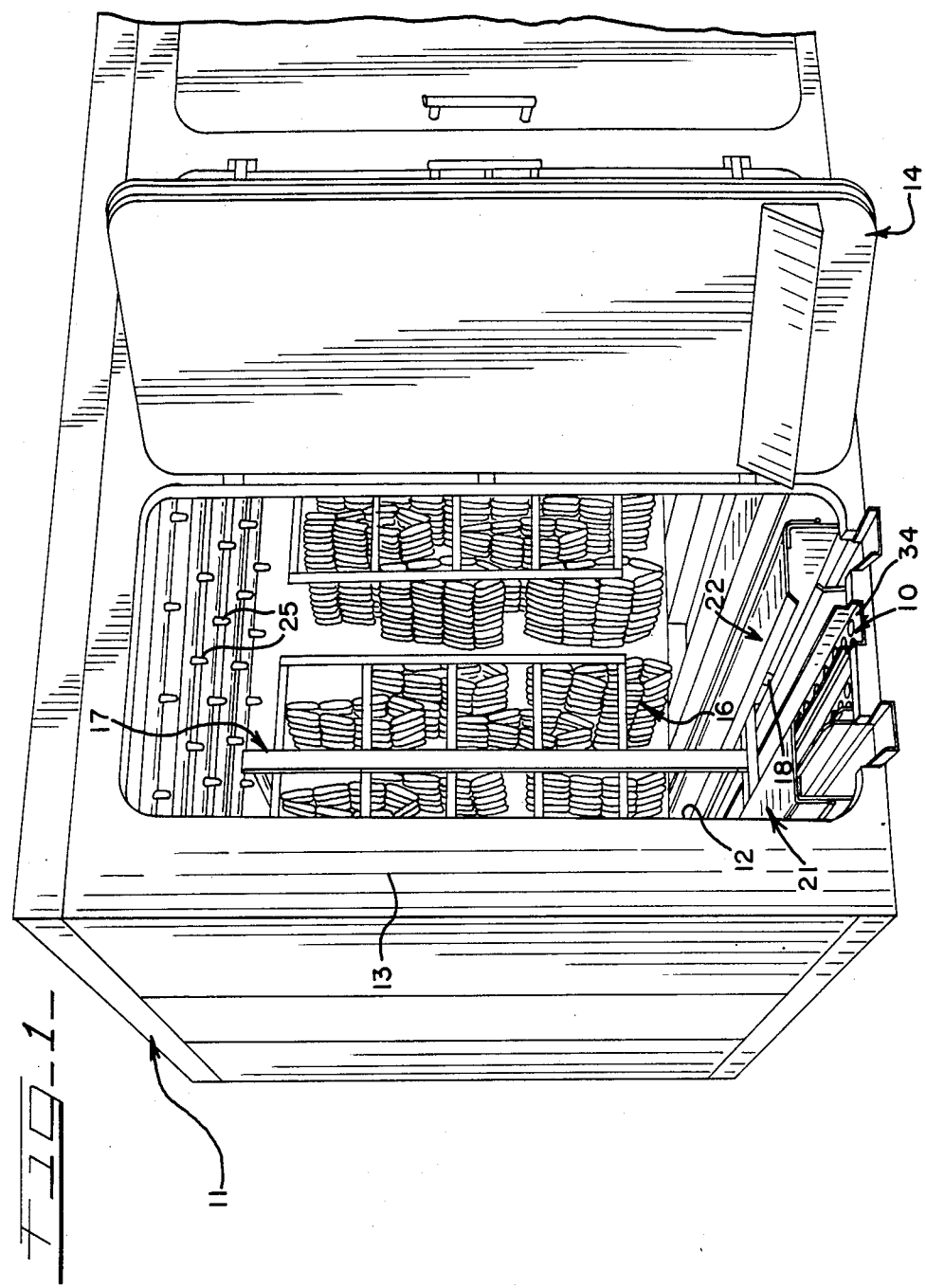

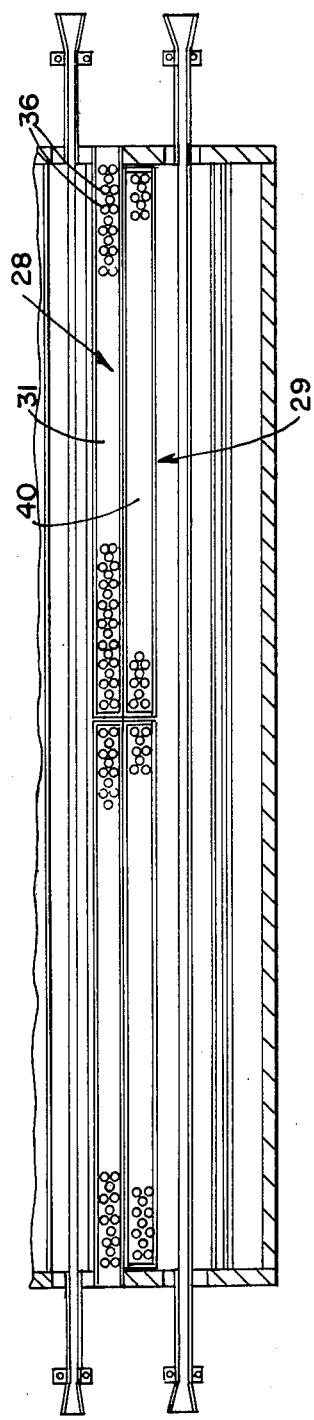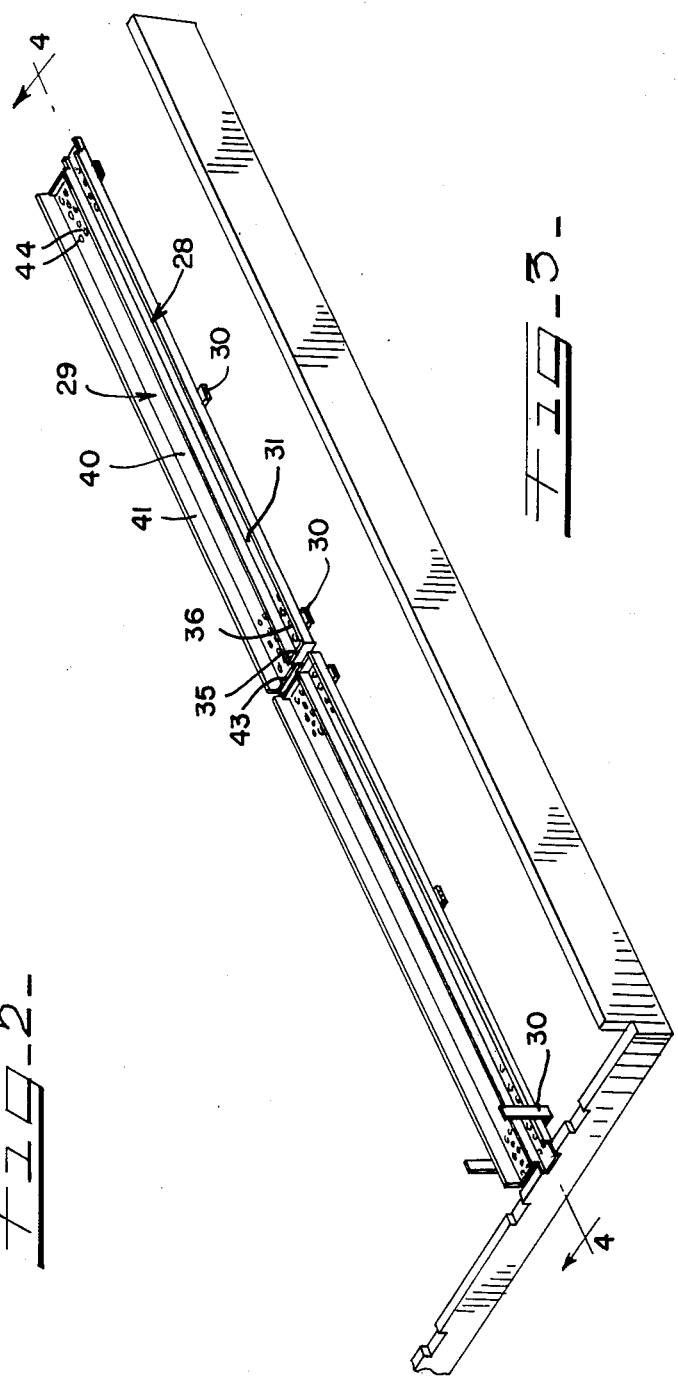

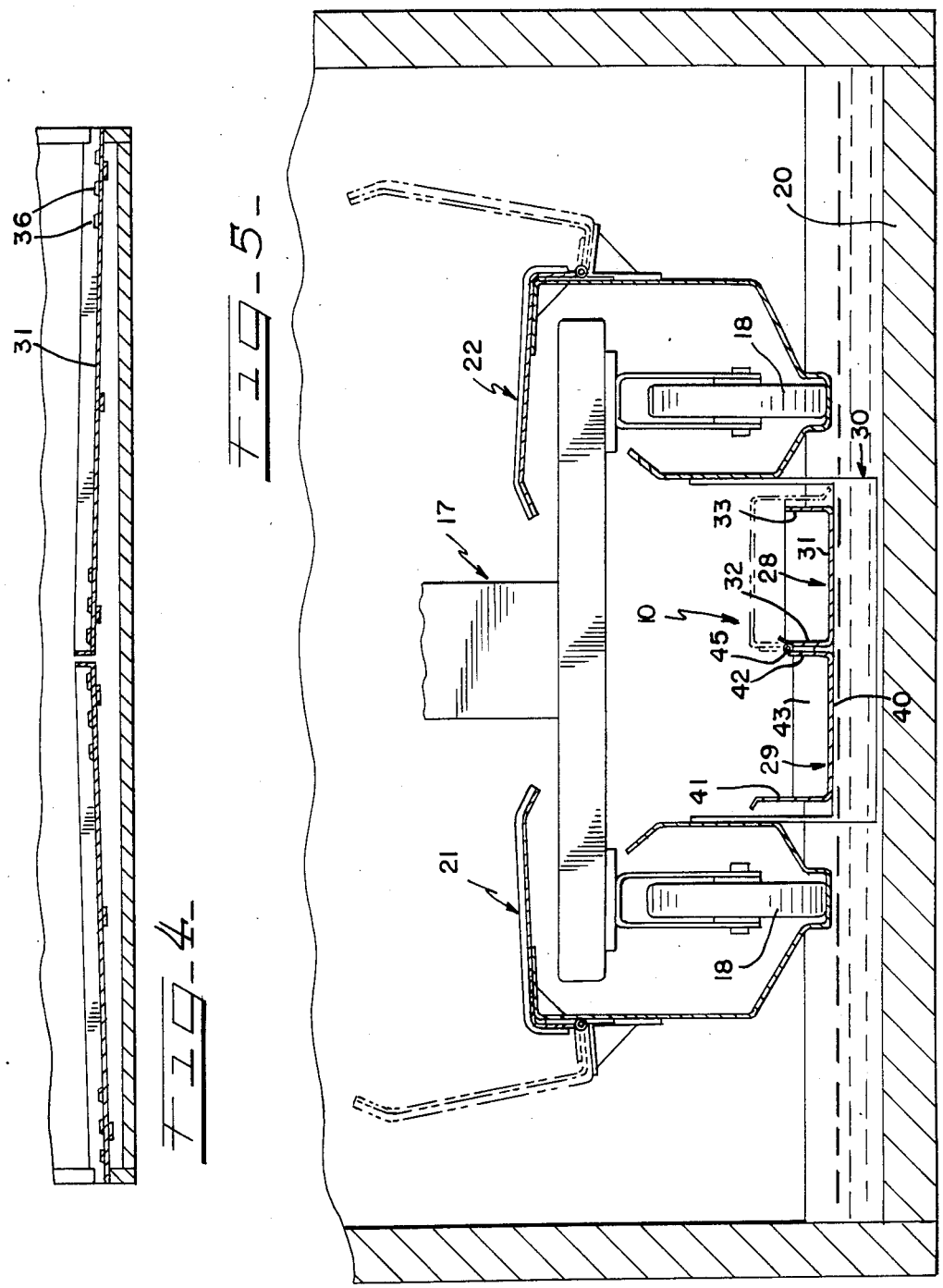

WALKWAY FOR A LIQUID HEAT TRANSFER CABINET

DESCRIPTION

This invention relates in general to a liquid heat transfer cabinet for subjecting a food product to a heat transfer operation, and more particularly to a cabinet constructed to be loaded and unloaded manually with product supporting devices, and still more particularly to such a cabinet having a contamination-free walkway to allow an operator to enter and leave the cabinet in the loading and unloading process without contaminating the liquid medium used for the heat transfer operation.

BACKGROUND OF THE INVENTION

Heretofore, it has been well known to subject food products such as meat to heat transfer operations by blast air systems. Particularly, cooked meat has been cooled by such systems so that they thereafter may be further processed and packaged. However, such blast air systems, when used to chill cooked meat, result in product dehydration that is undesirable. Further, such systems require extended periods of time to accomplish the desired heat transfer results.

Accordingly, liquid heat transfer systems have been more recently developed which rely on the substantial uniform application of temperature conditioning liquid to the meat product. This results in eliminating the dehydration problem and also substantially reducing the time period necessary for the same heat transfer operation. More particularly, these systems have been used to decrease the temperature of meat products that have been cooked and are referred to as brine-chilling systems where the liquid cooling medium is a brine solution applied at a controlled temperature. The brine solution is sprayed evenly over the product surface effecting an intensive heat exchange between the product and the liquid cooling solution where the heat is removed from the product by the brine solution. Thereafter, the brine solution is reconditioned and recirculated for further application of the product. Such systems have been marketed by the Alkar Division of DEC International, Inc. in Lodi, Wis.

The advent of the brine chilling systems has led to further developments with respect to the handling of the meat-supporting devices, such as disclosed in U.S. Pat. No. 4,505,205, assigned to the assignee of this application, where an enclosed floor track system for a liquid processing cabinet allows the use of wheeled meat-supporting devices. That part of the disclosure in said patent relating to the brine chilling system is hereby incorporated by reference. The enclosed track systems prevent the contamination of the liquid cooling medium and are U.S.D.A. approved. The disadvantage of this system is in the requirement that an expensive conveying system be provided for loading and unloading the liquid processing cabinet with the meat-supporting racks or devices.

SUMMARY OF THE INVENTION

The present invention overcomes the expensive loading and unloading requirements of heretofore known liquid processing cabinets for food products in providing a walkway device that is U.S.D.A. approved and enables an operator to enter and leave a cabinet for the purpose of manually loading and unloading food-supporting racks without contaminating the liquid heat transfer medium. Elimination of sophisticated conveying devices also reduces the space requirements for such a cabinet, thereby enhancing the versatility of such cabinets.

The walkway device of the invention includes a fixed channel-shaped member arranged along the path of movement of the meat-supporting devices and mounted above the liquid level of the liquid heat transfer medium and a cover member hinged to one side of the fixed member that is selectively movable between a covering position of the fixed member to an open position defining a further walkway area. Thus, in the open position, two parallel walkway areas are defined by the fixed member and the cover member, both of which are above the level of the liquid cooling medium in the cabinet and which therefore prevent contamination of the liquid medium when an operator moves along the walkway. It will readily be appreciated that when the cover member is in closed position, the fixed member is shielded from the falling liquid cooling medium to prevent contamination of the medium during the heat transfer operation.

Accordingly, the walkway device of the invention eliminates the need for an expensive conveyer mechanism for handling the meat or food racks during loading and unloading of the cabinet and generally simplifies the overall procedure of loading and unloading.

It is therefore an object of the present invention to provide a walkway device for a liquid heat transfer cabinet for food products that prevents contamination of the liquid heat transfer medium.

It is a further object of the present invention to provide a U.S.D.A. approved walkway device for a liquid heat transfer cabinet that is used for the temperature conditioning of food products.

Another object of the invention is in the provision of a contamination-free walkway device for a liquid heat transfer cabinet that permits the operator to enter and leave the cabinet for the purpose of manually loading and unloading product supporting devices.

A still further object of the present invention is in the provision of a walkway device for a liquid heat transfer cabinet for temperature conditioning food products that is easily converted from a closed structure during a liquid heat transfer operation to an open structure for defining a walkway during loading and unloading of the cabinet with the product to be treated.

Other objects, features and advantages of the invention will be apparent from the following detailed disclosure, taken in conjunction with the accompanying sheets of drawings, wherein like reference numerals refer to like parts, in which:

BRIEF DESCRIPTION OF THE DRAWINGS

FIG. 1 is a fragmentary prospective view of a liquid heat transfer cabinet for temperature conditioning product showing one loading and unloading opening and the walkway device of the invention in open position to define a walkway area for an operator to enter and leave the cabinet without contaminating the liquid on the floor of the cabinet;

FIG. 2 is a top plan view of the enclosed floor track system and the walkway device of the present invention and also illustrating the walkway device in open position;

FIG. 3 is a prospective view of the walkway device of the present invention and illustrating it in open position;

FIG. 4 is a detailed vertical sectional view of the walkway device of the invention taken substantially along line 4—4 of FIG. 3 and illustrating the pitching of the walkway to allow any collected liquid to flow to the exterior of the cabinet; and FIG. 5 is an enlarged transverse sectional view taken through the enclosed floor track system of a cabinet and the walkway device of the present invention showing the cover member of the walkway device in solid in open position and in phantom in closed position.

DESCRIPTION OF THE INVENTION

The walkway device of the present invention defines a contamination-proof walkway for a cabinet used for subjecting a food product to liquid heat transfer operations. While the type of cabinet the walkway serves is primarily useful to effect brine chilling of a meat product, it could be used to produce brine chilling of any type of food or other product where a brine solution is used as the liquid transfer medium. Such a cabinet must be U.S.D.A. approved. The invention would also be useful if the liquid transfer medium was intended to raise rather than lower the temperature of the product such as in a cooking operation and particularly where liquid is collected on the floor of the cabinet to be directed to a collecting basin and reconditioned for further distribution within the cabinet. Such reconditioning would normally include filtering and temperature conditioning. In a brine chiller, the brine solution would increase in temperature once it has been sprayed over a cooked meat product, and therefore it would need to be chilled before recirculating for further heat transfer work. It should further be appreciated that the liquid cooling medium could be or propylene glycol which has been approved for contact with food products.

The walkway device of the present invention is illustrated in a cabinet where wheeled meat-supporting racks are employed that necessitate an enclosed floor track as in the aforementioned U.S. patent to meet U.S.D.A. approval and prevent liquid contamination. However, it should be appreciated that the walkway device of the invention could equally be useful in a cabinet where the meat-supporting devices are suspended and movable along an overhead track and where there would be no necessity for the enclosed floor track system. Quite obviously, the walkway device could even be used in a cabinet which would not only include an overhead track system but a floor track system where the cabinet would be capable of handling both overhead suspended meat-supporting devices and wheel-supported racks.

Referring now to the drawings, and particularly to FIG. 1, a walkway device of the present invention, generally designated by the numeral 10, is illustrated in a liquid heat transfer cabinet 11 in the mode where an operator may use the walkway during loading and unloading of the cabinet as an area for walking. For purposes of illustrating the invention, the walkway is shown in a cabinet having multiple loading areas and particularly with respect to one of the loading areas which is defined by a loading and unloading opening 12 formed in an upstanding front wall 13. The opening is selectively opened and closed by a door 14 shown in open position. It will be appreciated that the cabinet forms an enclosure in which product is subjected to heat transfer operations.

As mentioned, the heat transfer cabinet is provided with a system of transferring heat from a product to a liquid heat transfer medium, and to focus in on one of the principal types of heat transfer operations, the liquid heat transfer medium will be hereinafter referred to as a brine solution. Moreover, the brine solution is temperature conditioned and cooled for the purpose of removing heat from a cooked meat product to cool the product to an acceptable level for further processing. Thus, a brine chiller functions to quickly reduce the temperature of cooked meat. The meat product illustrated in FIG. 1 is sausages 16 supported on a meat-supporting device in the form of a meat-supporting rack 17 that is provided with wheels 18 so that it is floor supported and can be readily movable along a floor in any direction. It will be appreciated that overhead rail-supported meat-supporting devices may also be employed. In order to prevent contamination of the brine solution which collects on the floor 20 of the cabinet, an enclosed track system, as disclosed in the aforementioned patent, including parallel enclosed trackways 21 and 22, serve to receive the meat rack wheels 18 and prevent the solution from entering the trackways during the heat transfer operation.

The brine solution is sprayed over the meat product by overhead mounted spray nozzles 25. Thus, the falling brine solution contacts the meat product to transfer heat from the meat product to the solution and falls to the floor of the cabinet to be collected, filtered, temperature conditioned, and recirculated for further spray application to the meat product, as disclosed in the above identified U.S. Pat. No. 4,505,205.

While the meat product on the meat-supporting racks may be both loaded and unloaded through the opening 12. it should also be appreciated that the racks may only be loaded through opening 12 and unloaded through an opening opposite opening 12 and formed in the back wall of the cabinet. In such a case, the meat-supporting racks are moved through the cabinet during the unloading process. FIGS. 2, 3 and 4 illustrate the manner in which the enclosed trackways and the walkway device of the invention would be constructed where the cabinet is capable of allowing straight-through movement of meat-supporting racks.

The walkway device 10 of the present invention, while illustrated as being mounted to the cabinet mounted enclosed trackways 21 and 22, would be otherwise mounted where an overhead rail system for supporting meat racks would be utilized. It will be appreciated that where an overhead rail for supporting meat racks is used, suitable mounting arrangements would be provided for mounting the walkway device at about the same level illustrated in FIG. 5, which would be above the maximum expected liquid level on the floor of the cabinet.

The walkway device of the invention includes a fixed channel-shaped member 28 and hinged to one edge thereof a movable or swingable channel-shaped member 29. The fixed member 28 is permanently mounted on U-shaped hangers 30 secured to and suspended from the enclosed trackways 21 and 22. Both the fixed swingable members 28 and 29 extend parallel to the trackways 21 and 22, while the hangers 30 extend transverse the channel members 28 and 29. As seen particularly in FIG. 5, the channel members are disposed between the trackways 21 and 22 and when in open position, as shown in solid lines, are in side-by-side relation and both supported by the hangers 30 and define two trackway areas in which an operator can walk when entering and leaving the cabinet during the loading and unloading of meat racks 17. When swinging the movable member 29 into closed position, as shown in phantom in FIG. 5, it will be appreciated that it functions as a cover to prevent falling brine solution from entering the walkway.

As seen particularly in FIGS. 2 to 5, the fixed channel-shaped member 28 includes a horizontal floor or lower wall 31 that is inclined to allow any brine solution entering the member to flow outwardly of the cabinet, as seen in FIG. 4. Upstanding from the floor 31 are side walls 32 and 33. The outer end of the channel-shaped member 28 is received in a notch 34 formed at the bottom of the opening 12 in the front wall 13 to allow any collected brine solution to flow to the exterior of the cabinet. The inner end of the fixed channel-shaped member 28 includes an end wall 35, as seen in FIG. 3. In order to increase the traction for walking, the floor 31 of the fixed member is provided with raised dimples 36. Any roughening of the surface may be used to enhance traction.

Because of the normal required length of a cabinet, the walkway device is split into two sections, as shown in FIGS. 2, 3 and 4, where one section is pitched toward one wall of the cabinet and the other toward the other wall of the cabinet and where openings would be provided on both ends of the cabinet to allow pass-through movement of meat racks. Thus, loading would be effected at one end of the cabinet, while unloading at the other end, enhancing the production line movement of goods through the cabinet. However, the walkway may be made in a single section, and the cabinet may be constructed for loading and unloading at the same end.

The movable or swingable channel-shaped member or cover 29 includes a top wall 40 and opposite side walls 41 and 42. It will be appreciated that the top wall 40 functions as a top wall when the cover is in closed position and functions as a bottom wall or walking surface when in open position. Member 29 is slightly shorter than member 28, as it must clear the door when the door is closed. It is therefore provided with dimples 44 like the bottom wall or floor 31 of the fixed channel member 28. the side wall 42 is hingedly connected to the side wall 32 of the fixed channel member 28 by a hinge 45. While the hinge illustrated is in the form of a butt hinge, it may take any desired form. The side wall 41 is longer than the side wall 42 so that it can overlap the side wall 33 of the fixed channel member 28. Further, it will be noted that the top wall 40 of the swingable channel-shaped member 29 is slightly wider than the bottom wall of the fixed channel member 28 so that the side wall 41 may easily overlap the side wall 33 of the fixed channel-shaped member in closed position, as shown in FIG. 5. Moreover, the length of the side wall 41 is such that when the cover is in closed position, its free edge functions as a stop and rests on the U-shaped hangers 30.

In operation, it will be appreciated that the pitching of the bottom wall of the fixed channel-shaped member 28 prevents the collection of brine solution by allowing it to flow outwardly of the cabinet during a cooling operation when the cabinet doors are closed and brine solution is being discharged from the nozzles to contact the product in the cabinet. Since the walkway device will be in the closed mode with the swingable channel-shaped member 29 closed over the fixed channel-shaped member 28, falling brine solution will not enter the walkway. It will be appreciated that the cover member may be manually swung to open position where it will rest against the hangers 30 when it is desired to use it as a walkway during the loading and unloading of the cabinet. The operator can then walk on the walkway without contaminating the brine solution collected on the floor of the cabinet or without adding contaminants to the floor if there is no solution collected on the floor. Further, since the mounted level of the walkway is above any expected solution level on the floor of the cabinet, it will not be possible for the walkway to transfer any contamination to the brine solution. Therefore, the present invention provides a walkway for a liquid heat transfer cabinet that meets the standards of U.S.-D.A. where the cabinet is used for processing food products.

It will be understood that modifications and variations may be effected without departing from the scope of the novel concepts of the present invention, but it is understood that this application is to be limited only by the scope of the appended claims.

We claim:

1. In an apparatus for subjecting a food product to a liquid heat transfer operation, wherein the apparatus includes an enclosure having a ceiling, a floor, side and end walls, and an opening in one of the side or end walls selectively closable by a door, product supporting means adapted to be selectively loaded into or unloaded from the enclosure through said opening, a heat transfer system having a liquid heat transfer medium, means above said floor for substantially evenly distributing the medium over product supported by said product supporting means, means collecting the medium including the floor, and means for temperature conditioning the medium and recycling it through the distributing means, the improvement being in means for permitting an operator to enter the enclosure during loading and unloading of said product supporting means without contaminating the liquid heat transfer medium, said means comprising a walkway device mounted above the floor and easily convertible from an open walkway above the level of the liquid medium on the floor for the operator to walk on during loading and unloading to a closed walkway during heat transfer operation to prevent entrance of distributed liquid heat transfer medium.

2. The improvement defined in claim 1, wherein said walkway device includes a fixed upwardly opening channel shaped member and a movable channel shaped member hingedly connected to said fixed member.

3. The improvement defined in claim 2, wherein said fixed member is pitched and in communication with the exterior of the enclosure to allow any liquid therein to flow out of the member and to the exterior of the enclosure.

4. The improvement defined in claim 3, wherein the fixed and movable members have walking surfaces and means on the surfaces to provide traction during walking thereon.

5. The improvement defined in claim 4, wherein means is provided to support the movable member in side-by-side relation with the fixed member when the walkway is open.

6. In an apparatus for subjecting a food product to a liquid heat transfer operation, wherein the apparatus includes a cabinet for receiving product to be subjected to a heat transfer operation and a liquid heat transfer system having a liquid heat transfer medium, a walkway device mounted above the floor for permitting an operator to walk into the cabinet without contaminating the liquid heat transfer medium, said device comprising a fixed upwardly opening elongated channel shaped member and a movable elongated channel shaped member hingedly connected to said fixed member and selectively movable between open and closed modes, whereby said movable member is upwardly opening and disposed in side-by-side relation to the fixed member when the movable member is in said open mode and is downwardly opening and in covering relation to the fixed member when in closed mode.

7. The walkway device defined in claim 6, wherein hanger members are provided to support the device and includes horizontal portions extending perpendicular to said channel shaped members, said fixed member being fixed to said horizontal portions and said movable member resting on said horizontal members when in the open mode.

8. The walkway device defined in claim 7, wherein said fixed member is pitched and in communication with the exterior of the enclosure to allow any liquid therein to flow out of the member and to the exterior of the enclosure.

9. The walkway device defined in claim 8, wherein the fixed and movable members have walking surfaces and means on the surfaces to provide traction during walking thereon.

10. In a meat processing system for subjecting meat to a liquid heat transfer operation, wherein said system includes a closed cabinet into which meat is disposed during the heat transfer operation, means for temperature conditioning liquid, means for applying the liquid to the meat, said cabinet having a floor constructed to collect the liquid, means for receiving the liquid from the floor and recycling it through said temperature conditioning means, and meat supporting means movable into and out of the cabinet, the improvement being in means allowing an operator to enter the cabinet for manually moving the meat supporting means into and out of the cabinet without contaminating liquid collected on the floor of the cabinet, said means comprising a walkway device mounted above the cabinet floor and the liquid level which functions as a walkway for an operator when the system is not operating and prevents collected liquid on the floor from entering the walkway, and which is enclosable when the liquid transfer operation is being carried out to prevent liquid from entering the walkway during application of the liquid to the meat.

* * * * *